(12) United States Patent
Gurrobat

(10) Patent No.: US 10,827,862 B1
(45) Date of Patent: Nov. 10, 2020

(54) JERKY DRINKING STRAW

(71) Applicant: Sheldon K. Gurrobat, Las Vegas, NV (US)

(72) Inventor: Sheldon K. Gurrobat, Las Vegas, NV (US)

( * ) Notice: Subject to any disclaimer, the term of this patent is extended or adjusted under 35 U.S.C. 154(b) by 0 days.

(21) Appl. No.: 16/716,536

(22) Filed: Dec. 17, 2019

(51) Int. Cl.
*A47G 21/18* (2006.01)
*A23P 30/20* (2016.01)
*A23L 13/60* (2016.01)

(52) U.S. Cl.
CPC ............ *A47G 21/183* (2013.01); *A23L 13/60* (2016.08); *A23P 30/20* (2016.08); *A47G 2400/105* (2013.01)

(58) Field of Classification Search
CPC .................. A47G 21/18; A47G 21/183; A47G 2400/105; A23P 30/20; A23L 13/60
See application file for complete search history.

(56) References Cited

U.S. PATENT DOCUMENTS

| | | | | | |
|---|---|---|---|---|---|
| 2,113,404 | A | * | 4/1938 | Hopwood | B65D 85/305 217/65 |
| 3,698,123 | A | * | 10/1972 | Heldt | A63H 33/101 446/120 |
| 4,879,128 | A | * | 11/1989 | Morin | B65D 81/24 426/392 |
| 5,141,761 | A | * | 8/1992 | Haerr | A23B 4/064 426/393 |
| 2004/0013772 | A1 | | 1/2004 | Weiss | |
| 2005/0109857 | A1 | | 5/2005 | Boone | |
| 2007/0128579 | A1 | * | 6/2007 | Shima | A61C 9/002 433/74 |
| 2015/0327721 | A1 | * | 11/2015 | Gaylor | A47J 43/18 99/419 |
| 2017/0223974 | A1 | * | 8/2017 | Bauer | B65B 25/065 |
| 2017/0245534 | A1 | * | 8/2017 | Fritz | A23L 13/67 |

OTHER PUBLICATIONS

"Bacon Straws for Jaden." May 5, 2010. <https://www.unclejerryskitchen.com/recipes/bacon-straws-for-jaden>. Accessed Mar. 11, 2020. (Year: 2010).*

DeWan, James. "Thinned to Perfection." Jul. 31, 2013. <https://www.chicagotribune.com/dining/ct-xpm-2013-07-31-sc-food-0726-prep-scaloppine-20130731-story.html>. Accessed Mar. 11, 2020. (Year: 2013).*

(Continued)

*Primary Examiner* — Ericson M Lachica
(74) *Attorney, Agent, or Firm* — Bayramoglu Law Offices LLC

(57) ABSTRACT

A drinking straw and a method of manufacturing a drinking straw. The drinking straw is made from any type of protein. Meat slices are placed in a freezer and the slightly frozen and pressed meat slices are then rolled lengthwise onto greased rods. The meat covered rods are again rolled on a flat surface. The meat covered rods are spaced apart and placed in a marinade. After the meat covered rods soak in the marinate, the meat covered rods are removed and placed on a rack, where the rods are spaced apart. The rack is placed into a 350° F. oven to bring the meat temperature up to 350° F., then the oven temperature is reduced to 165° F. The meat covered rods on the rack is dehydrated for four to five hours. After the dehydrating time has elapsed, the meat drinking straws is removed from the rods.

19 Claims, 7 Drawing Sheets

(56) References Cited

OTHER PUBLICATIONS

"Coke Soaked Bacon." May 15, 2017. <https://www.aspicyperspective.com/coke-soaked-bacon>. Accessed Mar. 11, 2020. (Year: 2015).*
Dehydrated Foodz. "Do You Cook it First or Dry it Raw? Tips for Dehydrating Bacon." Nov. 26, 2018. <https://dehydratedfoodz.com/do-you-cook-it-first-or-dry-it-raw-tips-for-dehydrating-bacon>. Accessed Mar. 11, 2020. (Year: 2018).*
Dehydrator Blog. "Dehydrating Time and Temperature Guide: Fruits, Vegetables, Meat, Herbs, Spices, and Leather." Dec. 29, 2018. <https://dehydratorblog.com/food-dehydrating-time-temperature-guide/#Jerky-Dehydrating-Time-and-Temperature>. Accessed Mar. 11, 2020. (Year: 2018).*
"How to Store Drinking Straws." Jul. 22, 2011. <thriftyfun.com/Storing-Drinking-Straws.html>. Accessed Mar. 11, 2020. (Year: 2011).*
Dean, Sam. "Beef Straws Let You Drink Through Beef." Mar. 6, 2012. <bonappetit.com/trends/article/beef-straws-let-you-drink-through-beef>. Accessed Mar. 11, 2020. (Year: 2012).*
"Do you really need olive oil to fry bacon?" Jan. 26, 2010. <https://cheftalk.com/threads/do-you-really-need-olive-oil-to-fry-bacon>. Accessed Sep. 24, 2020. (Year: 2010).*

* cited by examiner

JERKY DRINKING STRAW

TECHNICAL FIELD

The present disclosure relates to drinking devices and a method manufacturing the drinking devices. More specifically, the present disclosure relates to an edible jerky drinking straw and a method of manufacturing the edible jerky drinking straw.

BACKGROUND

It is known that edible drinking straws are made from candy and fruit and contain food preservatives as disclosed in US Patent Application Publication 2005/0109857. Also, edible drinking straws made from fruit powder or a mixture of fruit powders are known and disclosed in US Patent Application Publication US 2004/0013772. All of these known drinking straws are generally sweet and contain a large amount of sugar which can be extremely harmful to people having diabetes. Furthermore, it is well known that too much sugar causes weight gain and can cause diabetes and other health problems. Similarly, food preservatives are generally known by the public as not being healthy and in today's environment, people prefer to eat foods which do not contain food preservatives.

Therefore, the present invention is made from protein and avoids the problem of being harmful to people with diabetes. The drinking straw is made from beef, buffalo, chicken, pork, fish or any other meat from edible animals. The drinking straw can also be made from plant-based proteins such as any type of bean, including soybeans. Since the drinking straw is made from protein, the drinking straw is not made from any plastic material and therefore, is environmentally friendly.

SUMMARY

An object of the present invention is to provide a drinking straw and a method of manufacturing a drinking straw which solves the technical problems in the above prior art as well as being environmentally friendly.

Also, the present invention provides a drinking straw and a method of manufacturing the drinking straw.

A hot or cold liquid or other substance is sucked through and/or passes through an interior opening (i.e. flow channel) of the drinking straw. The interior opening of the drinking straw forms the entire length of the drinking straw.

The drinking straw is made from any type of protein such as beef, buffalo, chicken, pork, fish or any edible animal meat. The drinking straw can also be made from plant-based proteins such as any type of bean, including soybeans.

The drinking straw is made from a slice of meat (i.e. meat slice), where the meat slice is uniform in shape and thickness.

In another embodiment, the meat slice can be made from a non-uniform shaped slice of meat and/or non-uniform thickness. However, it is preferable to make the drinking straw from a uniform slice of meat.

The drinking straw is made from a single slice of meat. However, a plurality of slices of meat can be used to form/make the drinking straw.

The shape of the meat slices which are used to make the drinking straw are elongated (i.e. longer in one direction than another direction), oval, square, rectangular, round or any other polygonal or geometric shape. Preferably, the drinking straw is made from a meat slice which has an elongated shape. One such example is the drinking straw is made from a slice of meat which has the dimensions of a length of seven inches; a width of two and a half inches; and a thickness of one eighth of an inch. However, the length, width and thickness of the meat slice can be larger or smaller than to above example size.

The slices of meat can be flavored with any type of marinade. The marinade can include one or a plurality of different spices, oils, herbs and flavors. Alternatively, the slices of meat can include a dry rub of a single spice or herb or a plurality of spices, herbs and flavors.

The drinking straw is made from a frozen slice of meat or frozen slices of meat. However, the drinking straw can be made from a room temperature (i.e. about 70° F.) meat slice(s) or a meat slice(s) cooler (e.g. about 33° F.-69° F.) than room temperature.

When the drinking straw comprises a plurality of meat slices, the plurality of slices of meat can be stacked together such that the shapes of each meat slice is the same. For example, a first meat slice forms a first layer. Both all ends and sides of a second meat slice are in line respectively, with all ends and the sides of the first meat slice. All ends and sides of a third meat slice are in line respectively, with all ends and the sides of the second meat slice. The process is repeated with as many slices of meat as desired in order to form the desired drinking straw thickness.

In another embodiment, the plurality of slices of meat can be stacked in an offset position. For example, a first meat slice forms a first layer. An end of a second meat slice is placed on about the middle part of the first meat slice. An end of a third layer is placed on about the middle part of the second meat slice. The process is repeated with as many slices of meat as desired in order to form the desired length of the drinking straw.

The length of the drinking straw ranges from a length of one inch to one foot. However, if desired, the length of the drinking straw can be made smaller than one inch or larger than one foot.

The inner diameter or the outer diameter of the drinking straw ranges from about three eighths of an inch to half an inch. However, the inner diameter or the outer diameter of the drinking straw can be larger than half an inch or smaller than three eighths of an inch.

The method steps order, in making the drinking straw, can be different or varied from the steps disclosed below.

The meat slice(s) is/are placed on a rod or rods to form the drinking straw. The sliced meat is placed on the rod and is wrapped around the rod.

The rod is made from stainless steel, metal, an alloy, a composite material, or a plastic material.

The rod has a uniform diameter.

In another embodiment, the rod which the sliced meat is wrapped onto can have a non-uniform diameter such that the rods diameter is smaller at one end than at any other location along the rod. For example, the rods' diameter may be three eighths of an inch at one end of the rod and the rest of the rods' diameter may have a half inch diameter. Once the sliced meat is removed from the rod, the formed drinking straw has one end with a larger opening diameter than the other end of the drinking straw. The larger opening end of the drinking straw is placed into the drinking liquid or substance and the smaller opening end of the drinking straw is placed in the users mouth which solves the problem of allowing the drinking straw to provide more/larger drinking volume in a short amount of time. However, if desired, the user can reverse the operation/use of the drinking straw. For example, the smaller opening end of the drinking straw is placed into the drinking liquid or substance and the larger opening end of the drinking straw is placed in the user's mouth.

In another embodiment, the rod can have a continuous tapered diameter. For example, at one end of the rod, the rod has a certain diameter. Then along the entire length of the rod, the diameter of the rod is continuously increasing or decreasing.

In the above example, the rods' diameter(s) can be made smaller or larger in order to obtain the desired drinking straw diameter and opening for the specific use of the drinking straw.

The method of manufacturing the drinking straw is disclosed in detail below. The order of the method steps, in making the drinking straw, can be different or varied from the steps disclosed below. The below disclosed steps of making the drinking straw are described with using meat. However, as disclosed above, beef, buffalo, chicken, pork, fish or any other meat from edible animals or any plant-based protein such as any type of bean, including soybeans may be used in the below disclosed steps of making the drinking straw.

It starts with a good cut of meat or protein. Machine cut or hand cut the meat into a uniform or non-uniform block. Then freeze the block of meat. Next, using an electric meat slicer or an equivalent food cutting device, cut the frozen block into slices. For example, the meat slices have the length of seven inches; a width of two and a half inches and a thickness of one eighth of an inch. However, the length, width and thickness of the slice of meat can be larger or smaller than to above example size. If the meat slices are too thin, the meat will rip apart and if the meat slices are too thick, the meat will not be able to stick or be formed around a rod to which the meat will be rolled onto. Next, using a rolling pin or dowel or equivalent device, the meat slices are pressed with the rolling pin at least once in order to tenderize and compress the meat. The pressing of the meat closes gaps within and between the meat fibers and therefore, reduces the porosity of the meat. This solves the problem of preventing liquid from escaping/leaking from the inside of the formed drinking straw to the outside of the formed drinking straw. Therefore, the user of the straw will not have liquid spilled onto the user nor onto the users clothing. Next, the meat slices are placed on a tray, flat sheet or equivalent device and then placed in the freezer for approximately seven to eight minutes. The amount of time the meat slices are placed in the freezer can vary depending on the volume of the meat slices. The time the meat slices stay in the freezer can be more or less than seven to eight minutes. The rod is lightly greased with any type of cooking oil or equivalent cooking substance. The rod is preferably a stainless-steel rod which has a diameter ranging from three eighths of an inch to half an inch in diameter, but the diameter could be larger or smaller depending of the desired use of the drinking straw. The rod diameter sizes are chosen for optimum suction for the liquid beverages being suck up through the drinking straw. Next, the slightly frozen and pressed meat slices are then rolled lengthwise onto the greased rod or a plurality of greased rods. The meat slices are firmly overlapped onto the greased rod, so the meat slices fit tightly to the rod and the rod's shape. While applying pressure firmly to the rods, the meat covered rods are again rolled on a flat surface to further compress the meat creating structure and integrity to the meat. The meat covered rods are then placed in a marinade. The meat covered rods are spaced apart when placed in the marinade in order to prevent the rods from touching one another while in the marinade. This avoids the possibility of the rods from sticking to one another which could affect the metal structural integrity of the drinking straw. The meat covered rods are soak in the marinade for about twenty-four hours in a refrigerator. However, the meat covered rods can soak in the marinade longer or shorter than twenty-four hours depending on the desired flavor effect. For example, the meat covered rods can soak in the marinade for four hours or a week if desired. After the meat covered rods soak in the marinate, the meat covered rods are removed from the marinade and placed on a rack to let the excess marinade drain. The meat covered rods are spaced apart when being placed on the rack in order to prevent the meat from touching. While the meat covered rods are on the rack, place the rack into a 350° F. oven for four to six minutes to bring the meat temperature up to 350° F. This will prevent formation of bacteria during the final drying stage as well as satisfy the USDA Appendix Guidelines for making jerky. The oven temperature of 350° F. is a minimum temperature and the oven temperature may be as high as 375° F. A device to which the rack is placed can be any other cooking device such as any type of oven, a smoker or a grill. The cooking time of four to six minutes could be longer than six minutes or shorter than four minutes depending of the desired structure of the meat to which the drinking straw will be formed and it the meat has reached the temperature of 350° F. Once the desired cooking time (in this example four to six minutes) has elapsed, then reduce oven temperature to 165° F., which is a dehydrating temperature. However, the dehydrating temperature can be in the range of 150° F.-175° F. The meat on/covering the rods, where the rods are located on the rack, is dehydrated for four to five hours. However, the dehydrating time can be shorter than four hours or longer than five hours depending on the desired meat structure to make the drinking straw. After the dehydrating time has elapsed, remove the meat straws from the rods. If the meat sticks to the rod(s), place the meat covered rod(s) in the freezer for five to seven minutes. This will solve the problem of the meat sticking to the rod(s) by creating a gap between the rod(s) and the meat due to their different thermal contractions when exposed to a cold temperature. Therefore, removing the meat from the rod(s) is now easy since the meat does not stick to the rod(s). The meat drinking straw(s) is/are now made, and the meat drinking straw is ready for use and/or consumption. The meat drinking straw can be placed in a food grade container.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

REFERENCE NUMBERS

Figure 1:
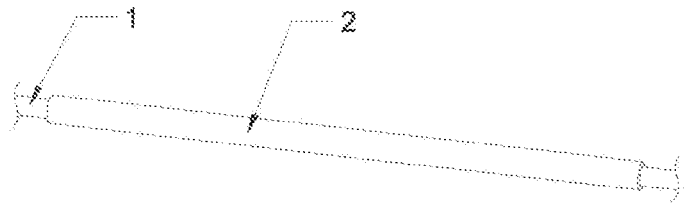
FIG. 1 is a schematic structural diagram of a meat slice on a rod.
Figure 2:
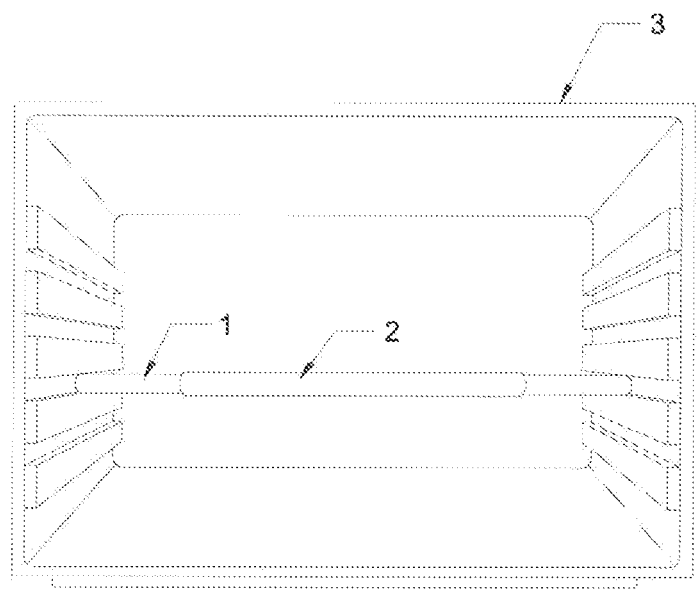
FIG. 2 is a schematic front view of the structural diagram of the meat covered rod place in an oven.
Figure 3:
FIG. 3 is a schematic perspective view of a plurality of slices of meat.
Figure 4:
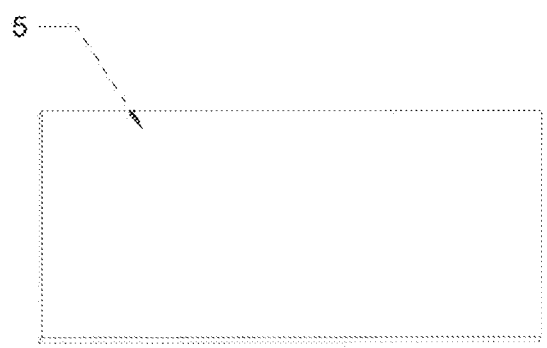
FIG. 4 is a schematic top view of a rectangular shaped slice of meat.

1—rod; 2—rolled sliced meat; 3—oven; 4—a plurality of slices of meat; 5—a single slice of meat; 6—a plurality of stacked slices of meat of the same size; 7—a plurality of slices of meat in an offset position; 8—continuous tapered diameter rod; 9—rod having a diameter smaller at one end than at any other location along the rod; 10—drinking straw; 11—opening/hole in the meat straw which forms a flow path along the entire length of the interior surface of the drinking straw; 12—cut/block of meat; 13—rack; 14—rolling pin; 15—dowel.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

The present invention of a drinking straw and method of manufacturing a drinking straw is described in detail below in reference to the figures.

FIGS. 1-10 illustrates the present invention drinking straw 10 and method of manufacturing the drinking straw 10.

The drinking straw 10 is made from any type of protein such as beef, buffalo, chicken, pork, fish or any edible animal meat. The drinking straw can also be made from plant-based proteins such as any type of bean, including soybeans.

The drinking straw is made from a slice of meat (i.e. meat slice), where the meat slice 5 is uniform in shape and thickness.

In another embodiment, the meat slice 5 can be made from a non-uniform shaped slice of meat and/or non-uniform thickness. However, it is preferable to make the drinking straw 10 from a uniform slice of meat.

The drinking straw is made from the single slice of meat 5. However, the plurality of slices of meat 4 can be used to form/make the drinking straw 10.

The shape of the meat slices which are used to make the drinking straw are elongated (i.e. longer in one direction than another direction), oval, square, rectangular, round or any other polygonal or geometric shape. Preferably, the drinking straw is made from the single slice of meat 5 which has an elongated shape. One such example is the drinking straw 10 is made from a slice of meat which has the dimensions of a length of seven inches; a width of two and a half inches; and a thickness of one eighth of an inch. However, the length, width and thickness of the meat slice can be larger or smaller than to above example size.

The slices of meat can be flavored with any type of marinade. The marinade can include one or a plurality of different spices, oils, herbs and flavors. Alternatively, the slices of meat can include a dry rub of a single spice or herb or a plurality of spices, herbs and flavors.

The drinking straw is made from a frozen slice of meat or frozen slices of meat. However, the drinking straw can be made from a room temperature (i.e. about 70° F.) meat slice(s) or a meat slice(s) cooler (e.g. about 33° F.-69° F.) than room temperature.

Figure 5:
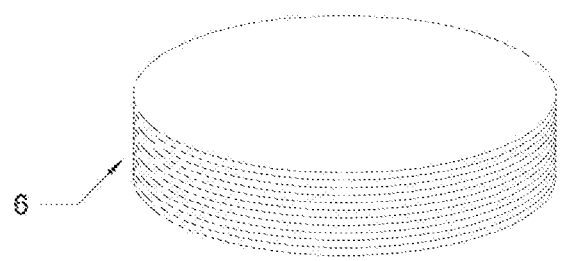
FIG. 5 is a schematic perspective view of a plurality of stacked slices of meat having the same size.

When the drinking straw comprises the plurality of meat slices 4, the plurality of slices of meat can be stacked together such that the shapes of each meat slice is the same as illustrated in FIG. 5. For example, a first meat slice forms a first layer. All ends and sides of a second meat slice are in line/match-up with respectively, with all ends and the sides of the first meat slice. All ends and sides of a third meat slice are in line/match-up with respectively, with all ends and the sides of the second meat slice. The process is repeated with as many slices of meat as desired in order to form the desired drinking straw thickness.

Figure 6:
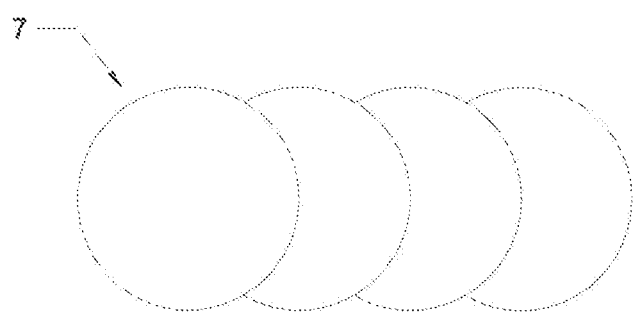
FIG. 6 is a schematic perspective view of a plurality of slices of meat in an offset position.

In another embodiment, the plurality of slices of meat can be stacked in an offset position as illustrated in FIG. 6. For example, a first meat slice forms a first layer. An end of a second meat slice is placed on about the middle part of the first meat slice. An end of a third layer is placed on about the middle part of the second meat slice. The process is repeated with as many slices of meat as desired in order to form the desired length of the drinking straw.

The length of the drinking straw 10 ranges from a length of one inch to one foot. However, if desired, the length of the drinking straw can be made smaller than one inch or larger than one foot.

The meat straw interior has the hole 11 extending through the entire interior length of the meat drinking straw forming a path which the liquid or other substance flows. The inner diameter or the outer diameter of the drinking straw ranges from about three eighths of an inch to half an inch. However, the inner diameter or the outer diameter of the drinking straw can be larger than half an inch or smaller than three eighths of an inch.

The meat slice(s) is/are placed on the rod 1 or rods to form the drinking straw. The sliced meat is placed on the rod 1 and is wrapped around the rod 1.

The rod 1 is made from stainless steel, metal, an alloy, a composite material, or a plastic material.

The rod 1 has a uniform diameter.

Figure 8:
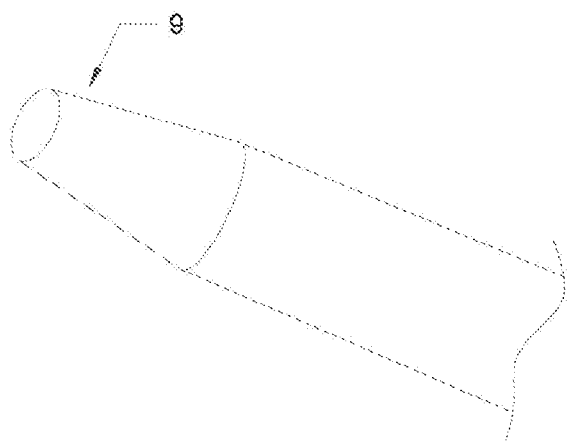
FIG. 8 is a schematic perspective view of a rod having a diameter smaller at one end than at any other location along the rod.
Figures 9, 10:
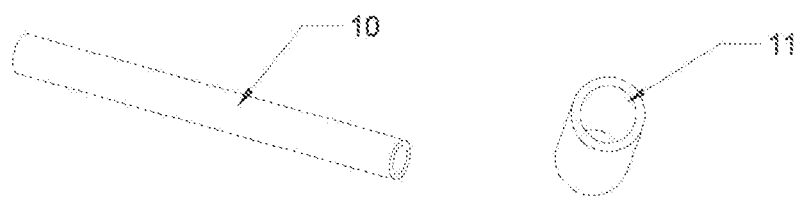
FIG. 9 is a schematic perspective view of the formed drinking meat straw.
FIG. 10 is a top view of the drinking meat straw illustrating holes in the top and bottom ends of the drinking meat straw.
Figure 11:
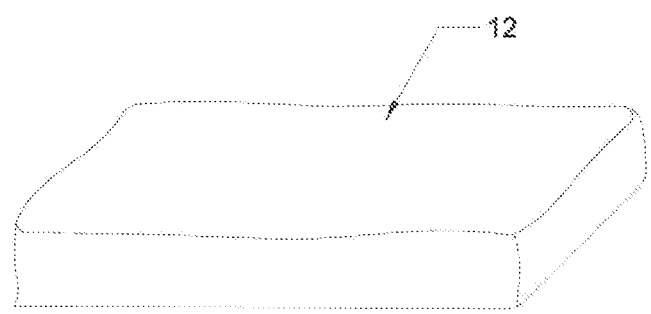
FIG. 11 is a schematic perspective view of a cut/block of meat.
Figure 12:
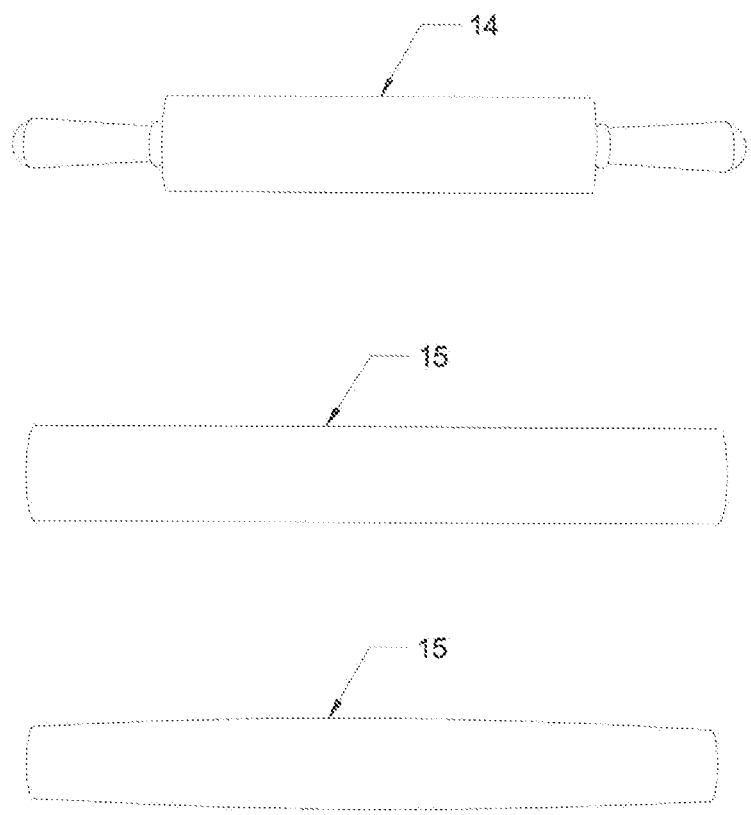
FIG. 12 is a schematic perspective view of a rolling pin and a dowel.
Figure 13:
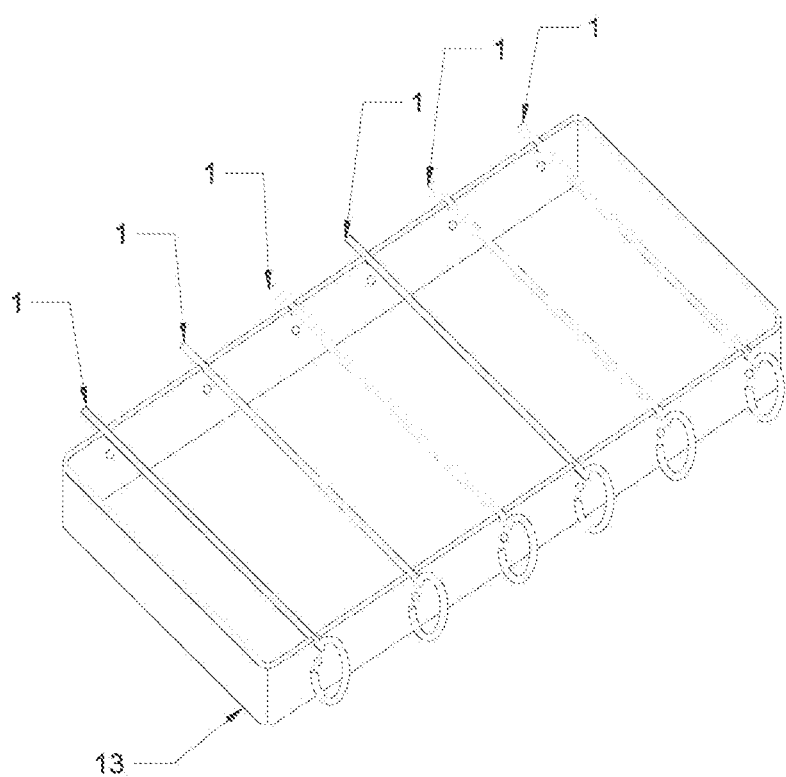
FIG. 13 is a schematic perspective view of a plurality of rods on a rack.

In another embodiment, the rod which the sliced meat is wrapped onto can have a non-uniform diameter such that the rods diameter is smaller at one end 9 than at any other location along the rod as showing in FIG. 8. For example, the rods' diameter may be three eighths of an inch at one end of the rod and the rest of the rods' diameter may have a half inch diameter. Once the sliced meat is removed from the rod, the formed drinking straw has one end with a larger opening diameter than the other end of the drinking straw. The larger opening end of the drinking straw is placed into the drinking liquid or substance and the smaller opening end of the drinking straw is placed in the users mouth which solves the problem of allowing the drinking straw to provide more/larger drinking volume in a short amount of time. However, if desired, the user can reverse the operation/use of the drinking straw. For example, the smaller opening end of the drinking straw is placed into the drinking liquid or substance and the larger opening end of the drinking straw is placed in the user's mouth.

Figure 7:
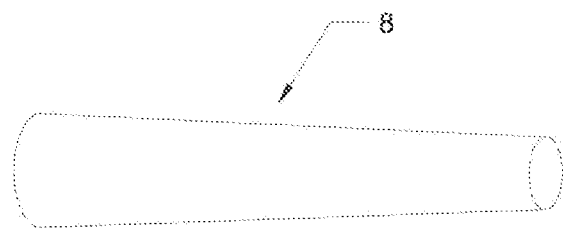
FIG. 7 is a schematic perspective view of a rod having a continuous tapered diameter.

In another embodiment, the rod can have the continuous tapered diameter 8 as shown in FIG. 7. For example, at one end of the rod, the rod has a certain diameter. Then along the entire length of the rod, the diameter of the rod is continuously increasing or decreasing.

In the above example, the rods' diameter(s) can be made smaller or larger in order to obtain the desired drinking straw diameter/opening for the specific use of the drinking straw.

The method of manufacturing the drinking straw is disclosed in detail below. The order of the method steps, in making the drinking straw, can be different or varied from the steps disclosed below. The below disclosed steps of making the drinking straw are described with using meat. However, as disclosed above, beef, buffalo, chicken, pork, fish or any other meat from edible animals or any plant-based protein such as any type of bean, including soybeans maybe used in the below disclosed steps of making the drinking straw.

Also, the method of manufacturing the drinking straw disclosed below is made with a single rod is only one straw is to be made or a plurality or rods if more than one straw is to be made.

A hot or cold liquid or other substance is sucked through and/or passes through the interior opening 11 (i.e. flow channel) of the drinking straw. The interior opening 11 of the drinking straw is formed through the entire length of the drinking straw 10.

Start with a good cut of meat 12 or protein. Machine cut or hand cut the meat into a uniform or non-uniform block. Then freeze the block of meat. Next, using an electric meat slicer or an equivalent food cutting device, cut the frozen block into slices. For example, the meat slices have the length of seven inches; a width of two and a half inches and a thickness of one eighth of an inch. However, the length, width and thickness of the slice of meat can be larger or smaller than to above example size. The thickness of the meat should be in the range of one sixteenth of an inch to half an inch since it was disclosed that if the meat slices are too thin, the meat will rip apart and if the meat slices are too thick, the meat will not be able to stick or to be formed around a rod to which the meat will be rolled onto. Therefore, when referring to the meat slice being thin, "thin" refers to this above disclosed meat slice thickness range. Next, using a rolling pin 14 or a dowel 15 or equivalent device, the meat slices are pressed with the rolling pin 14 at least once in order to tenderize and compress the meat. The pressing of the meat closes gaps within and between the meat fibers and therefore, reduces the porosity of the meat. This solves the problem of preventing liquid from escaping/leaking from the inside of the formed drinking straw to the outside surface of the formed drinking straw. Therefore, the user of the drinking straw will not have liquid spilled onto himself/herself nor onto the users clothing. Next, the meat slices are placed on a tray, flat sheet or equivalent device and then the tray is placed in the freezer for approximately seven to eight minutes. The amount of time the meat slices are placed in the freezer can vary depending on the volume of the meat slices. The time the meat slices stay in the freezer can be more or less than seven to eight minutes. The rod 1 is lightly greased with any type of cooking oil or equivalent cooking substance. The rod is preferably a stainless-steel rod which has a diameter ranging from three eighths of an inch to half an inch in diameter, but the diameter could be larger or smaller depending of the desired use of the drinking straw. The rod diameter sizes are chosen for optimum suction for the liquid beverages being sucked up through the drinking straw. Next, the slightly frozen and pressed meat slice is then rolled lengthwise onto the greased rod. The meat slice is firmly overlapped onto the greased rod, so the meat slice fits tightly to the rod and the rod's shape. While applying pressure firmly on the rod, the meat covered rod is again rolled on a flat surface to further compress the meat creating structure and integrity to the meat. When making a plurality of meat drinking straws, the meat covered rods are then placed in a marinade and spaced apart when placed in the marinade in order to prevent the rods from touching one another while in the marinade. This avoids the possibility of the rods from sticking to one another which could affect the metal structural integrity of the drinking straw. The meat covered rods soak in the marinade for about twenty-four hours in a refrigerator. However, the meat covered rods can soak in the marinade longer or shorter than twenty-four hours depending on the desired flavor effect. For example, the meat covered rods can soak in the marinade for four hours or a week if desired. After the meat covered rods soak in the marinate, the meat covered rods are removed from the marinade and placed on the rack 13 to let the excess marinade drain. The meat covered rods are spaced apart when being placed on the rack 13 in order to prevent the meat from touching. While the meat covered rods are on the rack 13, place the rack 13 into a 350° F. oven 3 for four to six minutes to bring the meat temperature up to 350° F. This will prevent formation of bacteria during the final drying stage as well as satisfy the USDA Appendix Guidelines for making jerky. The oven temperature of 350° F. is a minimum temperature and the oven temperature may be as high as 375° F. A device to which the rack 3 is placed can be any other cooking device such as any type of oven, a smoker or a grill. The cooking time of four to six minutes could be longer than six minutes or shorter than four minutes depending of the desired structure of the meat to which the drinking straw will be formed and if the meat has reached the temperature of 350° F. Once the desired cooking time (in this example four to six minutes) has elapsed, then reduce oven temperature to 165° F., which is a dehydrating temperature. However, the dehydrating temperature can be in the range of 150° F.-175° F. The meat on/covering the rods, where the rods are located on the rack, is dehydrated for four to five hours. However, the dehydrating time can be shorter than four hours or longer than five hours depending on the desired meat structure to make the drinking straw. After the dehydrating time has elapsed, remove the meat straws from the rods. If the meat sticks to the rod(s), place the meat covered rod(s) in the freezer for five to seven minutes. This will solve the problem of the meat sticking to the rod(s) by creating a gap between the rod(s) and the meat due to their different thermal contractions when exposed to a cold temperature. Therefore, removing the meat from the rod(s) is/are now easy since the meat does not stick to the rod(s). The meat drinking straw(s) is/are now made, and the meat drinking straw is ready for use and/or consumption. The meat drinking straw can be placed in a food grade container.

Finally, it should be noted that the above embodiments are only used to illustrate the technical aspects of the present disclosure, rather than limit the embodiments. Although the present disclosure has been described in detail with reference to the foregoing embodiments, it should be understood by a person of ordinary skill in the art that the technical aspects described in the embodiments can still be modified or equivalent substitutions can be made to some or all of the technical features and the modifications or substitutions would not change the substance of the scope of the embodiments of the present disclosure.

What is claimed is:

1. A method of making a drinking straw, said method comprising:
    forming a meat slice by slicing a cut of meat;
    pressing the meat slice with a rolling pin, at least once, in order to tenderize and compress the meat slice;
    placing the meat slice on a tray and then placing the tray into a freezer;
    greasing a rod with cooking oil;
    after removing the meat slice from the freezer, rolling the meat slice lengthwise onto the rod so the meat slice conforms to the shape of the rod;
    while applying pressure to the rod, rolling the meat slice on the rod on a flat surface to further compress the meat;
    placing the meat slice on the rod in a marinade and allowing the meat slice and rod to soak in the marinade for a minimum of four hours in a refrigerator;
    after the meat slice on the rod has soaked in the marinade for the minimum of four hours, placing the meat slice on the rod in a rack to allow excess marinade to drain from the meat slice;
    while the meat slice on the rod are on the rack, placing the rack into an oven, elevating the temperature of the meat slice to 350° F.;
    once the meat slice temperature is 350° F., reducing the oven to a reduced temperature having a range between 150° F. and 175° F., which is a dehydrating temperature;
    allowing the meat slice to dehydrate in the oven for a minimum of four hours and then removing the meat slice from the oven and the rod to define the drinking straw.

2. The method of making the drinking straw according to claim 1, wherein the rod is made from stainless steel, a metal, an alloy, a composite material, or a plastic material.

3. The method of making the drinking straw according to claim 1, wherein the rod has a uniform diameter.

4. The method of making the drinking straw according to claim 1, wherein the meat slice has a shape which is elongated, oval, square, rectangular or round.

5. The method of making the drinking straw according to claim 1, wherein the meat slice has a thickness of one eighth of an inch.

6. The method of making the drinking straw according to claim 1, wherein a length of the meat slice is seven inches.

7. The method of making the drinking straw according to claim 1, wherein the meat slice is beef.

8. The method of making the drinking straw according to claim 1, wherein the drinking straw has an inner diameter ranging between three-eighths of an inch and one-half of an inch.

9. The method of making the drinking straw according to claim 1, wherein the sliced meat is placed in the freezer for seven to eight minutes.

10. The method of making the drinking straw according to claim 2, wherein the rod has a non-uniform diameter.

11. The method of making the drinking straw according to claim 10, wherein the diameter of the rod has a continuous taper.

12. The method of making the drinking straw according to claim 11, wherein the meat slice soaks in the marinade for twenty-four hours.

13. The method of making the drinking straw according to claim 1, wherein the reduced temperature is 165° F.

14. The method of making the drinking straw according to claim 1, wherein the meat slice dehydrates for four to five hours.

15. The method of making the drinking straw according to claim 1, wherein an opening is formed along an entire length of the drinking straw.

16. The method of making the drinking straw according to claim 1, wherein if the meat slice sticks to the rod, the rod is placed with the meat slice in the freezer for five to seven minutes.

17. The method of making the drinking straw according to claim 1, wherein the removed meat slice is placed in a food grade container.

18. The method of making the drinking straw according to claim 1, wherein the drinking straw is placed into a drinking liquid.

19. The method of making the drinking straw according to claim 2, wherein the rod has a uniform diameter.

* * * * *